United States Patent Office 3,152,861
Patented Oct. 13, 1964

3,152,861
PROCESS FOR THE PREPARATION OF
SODIUM BOROHYDRIDE
James S. Logan and Joel A. Zaslowsky, Woodbridge, Conn., assignors to Olin Mathieson Chemical Corporation, a corporation of Virginia
No Drawing. Filed Aug. 22, 1960, Ser. No. 50,888
8 Claims. (Cl. 23—14)

This invention relates to a novel method for the preparation of sodium borohydride. More particularly, it relates to the formation of sodium borohydride by the reaction of sodium hydride with diborane in the presence of a mixture of a lower dialkyl ether and a glycol ether containing a catalytic quantity of a trialkyl borate.

The alkali metal borohydrides, such as sodium borohydride, are well known in the art and are very useful compounds in that they are active reducing agents. They have been produced in a variety of ways but all of these are subject to one or more defects. The most successful industrial method for the prepartion of sodium borohydride is based on the reaction of trimethyl borate with sodium hydride. This reaction must be carried out at an elevated temperature, necessitating the use of considerable pressure to maintain the trimethyl borate in a liquid state. At lower temperatures and pressures the yields are poor. This process suffers from other major disadvantages in that considerable amounts of various by-products are formed including sodium tetramethoxy-borohydride and sodium trimethoxy-borohydride. As a consequence, the crude sodium borohydride produced in this process must be subjected to tedious and expensive purification processes in order to obtain sodium borohydride of the purity required in commerce.

In the process of this invention sodium borohydride is prepared by reacting sodium hydride with diborane while the reactants are in admixture with a lower dialkyl ether and a glycol ether containing a catalytic amount of a trialkylborate. The reaction between the sodium hydride and the diborane while the sodium hydride is in admixture with a lower dialkyl ether and a glycol ether containing a catalytic quantity of a trialkylborate appears to proceed according to the equation:

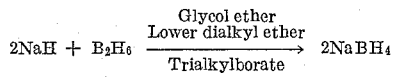

$$2\text{NaH} + \text{B}_2\text{H}_6 \xrightarrow[\text{Trialkylborate}]{\text{Glycol ether}} 2\text{NaBH}_4$$

The glycol ethers which are employed in the mixed solvent reaction medium in accordance with the present invention are those of the class $RO(CH_2CH_2O)_nR'$, wherein R and R' are alkyl radicals containing from 1 to 4 carbon atoms and $n$ is an integer of from 1 to 4. Among the suitable glycol ethers which can be used are ethylene glycol diethyl ether, ethylene glycol dimethyl ether, ethylene glycol di-n-butyl ether, diethylene glycol dimethyl ether, diethylene glycol diethyl ether, triethylene glycol dimethyl ether, triethylene glycol di-n-butyl ether, tetraethylene glycol dimethyl ether, tetraethylene glycol diethyl ether and the like. Suitable lower dialkyl ethers are those having from 1 to 4 carbon atoms in the alkyl group and include, for example, diethyl ether, di-n-propyl ether, diisobutyl ether, and di-n-butyl ether. Trialkylborates, suitable as catalysts, include trimethylborate, triethylborate, triisobutylborate, tri-n-propylborate and triamylborate. The reaction is generally conducted at temperatures within the range of from about 0° C. to about 100° C., although somewhat higher and somewhat lower temperatures can also be utilized, if desired. A major advantage of this process is that the sodium borohydride separates from the reaction mixture to form a white slurry from which the product can be easily separated by filtration. Another major advantage of this process is that the inexpensive lower dialkyl ethers are used as the major constituent of the reaction mixture. In general, the reaction mixture will contain from about 1 to about 20 mole percent of the glycol ether based on the number of moles of the lower dialkyl ether utilized. The quantity of trialkylborate used can be varied widely from about 5 to about 15 mole percent based on the number of moles of sodium hydride initially present in the reaction mixture.

The following examples illustrate the invention and are to be considered not limitative. In the examples the term "moles" signifies gram moles.

EXAMPLE I

The apparatus utilized in this experiment consisted of a 250 cc. three-necked flask equipped with a magnetic stirrer and fitted with a condenser cooled with Dry-Ice and a gas inlet tube. Exit gases from the condenser were passed through two series-connected scrubbers containing a 50 percent water-ethanol solution. The scrubbers, in turn, were connected to a wet test meter.

After the flask had been purged with nitrogen, 0.216 mole of sodium hydride in the form of a 53 percent by weight slurry in mineral oil and 133 cc. of diethyl ether were added with stirring. Then 13 cc. of diethylene glycol dimethyl ether and 0.0185 mole of trimethylborate were added and the system purged again with nitrogen. The mixture was stirred continuously while diborane at the rate of 50 cc. per minute (S.T.P.) was passed into the slurry. For about 40 minutes the diborane was completely adsorbed during which time the color of the mixture changed from a light gray to white. The flow of diborane to the reactor was continued until the flow rate of hydrogen passing through the wet test meter was six times the rate of diborane input indicating no further reaction of diborane feed with the reaction mixture. Then the system was purged with nitrogen and the sodium borohydride produced was recovered from the reaction mixture by filtration under a nitrogen atmosphere.

After being washed successively with small portions of diethyl ether and pentane, the product was dried by applying a vacuum for 20 hours. A total of 7.89 grams of sodium borohydride was obtained in this experiment. Analysis of the product for boron, sodium and hydrogen gave the following results:

|  | B | Na | H |
|---|---|---|---|
| Calculated for NaBH₄ | 60.8 | 28.6 | 10.6 |
| Found | 56.0 | 25.2 | 9.45 |

An aliquot of the filtrate from the above reaction was analyzed and found to contain no boron.

EXAMPLES II–V

A number of additional examples were performed in the same manner as described in Example I and using the same apparatus. In Example II a quantity of the filtrate obtained from the reaction mixture of Example I after removal of the product was used as the reaction medium in which additional sodium hydride and diborane were reacted and, likewise, in Example V filtrate from Example IV was used. The results of these experiments are summarized in Table 1 which follows.

Table 1
REACTION OF SODIUM HYDRIDE WITH DIBORANE

| Example | NaH (moles) | $(CH_3O)_3B$ (moles) | Solvent (cc.) | Temperature (°C.) | $NaBH_4$ (Grams recovered) | $NaBH_4$ (Percent yield) | Analysis of Product (Percent) | | |
|---|---|---|---|---|---|---|---|---|---|
| | | | | | | | Na | B | H |
| II | 0.216 | | 95 (filtrate from Example I) | 25 | 7.08 | 87 | 56.4 | 25.0 | 10.0 |
| III | 0.216 | 0.01 | 130 diethyl ether 13 ethylene glycol dimethyl ether. | 25 | 9.70 | 119 | 46.6 | 19.8 | 7.7 |
| IV | 0.216 | 0.0185 | 130 diethyl ether 13 diethylene glycol dimethyl ether. | 25 | 8.27 | 101 | 53.5 | 24.3 | 9.6 |
| V | 0.216 | | 90 (filtrate from Example IV) | 25 | 8.48 | 104 | 55.0 | 25.1 | [1] 9.0 |

[1] X-ray analysis revealed only the presence of a crystalline compound in which the ratio of Na:B:H atoms was 1:1:4.

What is claimed is:

1. A process for the preparation of sodium borohydride which comprises reacting sodium hydride with diborane in the presence of a lower dialkyl ether having from 1 to 4 carbon atoms in the alkyl group and a glycol ether containing a catalytic amount of a trialkylborate having from 1 to 5 carbon atoms in the alkyl group, said glycol ether having the formula:

$$RO(CH_2CH_2O)_nR'$$

wherein R and R' are alkyl radicals containing from 1 to 4 carbon atoms and $n$ is an integer of from 1 to 4, said glycol ether being present in the reaction mixture in an amount of from about 1 to about 20 mole percent based on the number of moles of the lower dialkyl ether, said trialkylborate being present in the reaction mixture in an amount of from about 5 to about 15 mole percent based on the number of moles of sodium hydride initially present, and recovering sodium borohydride from the reaction mixture.

2. The process of claim 1 wherein the reaction is carried out at a temperature between about 0° C. and about 100° C.

3. The process of claim 1 wherein the glycol ether is ethylene glycol dimethyl ether.

4. The process of claim 1 wherein the glycol ether is diethylene glycol dimethyl ether.

5. The process of claim 1 wherein the lower dialkyl ether is diethyl ether.

6. The process of claim 1 wherein the trialkylborate is trimethylborate.

7. The process for the preparation of sodium borohydride which comprises reacting sodium hydride with diborane in the presence of diethyl ether and ethylene glycol dimethyl ether containing a minor amount of trimethylborate, said glycol ether being present in the reaction mixture in an amount of from about 1 to about 20 mole percent based on the number of moles of diethyl ether, said trimethylborate being present in the reaction mixture in an amount of from about 5 to about 15 mole percent based on the number of moles of sodium hydride initially present, and recovering sodium borohydride from the reaction mixture.

8. The process for the preparation of sodium borohydride which comprises reacting sodium hydride with diborane in the presence of diethyl ether and diethylene glycol dimethyl ether containing a minor amount of trimethylborate, said glycol ether being present in the reaction mixture in an amount of from about 1 to about 20 mole percent based on the number of moles of diethyl ether, said trimethylborate being present in the reaction mixture in an amount of from about 5 to about 15 mole percent based on the number of moles of sodium hydride initially present, and recovering sodium borohydride from the reaction mixture.

References Cited in the file of this patent
UNITED STATES PATENTS

| 2,545,633 | Schlesinger et al. | Mar. 20, 1951 |
| 3,029,128 | Chamberlain | Apr. 10, 1962 |

FOREIGN PATENTS

| 950,062 | Germany | Oct. 4, 1956 |
| 1,204,002 | France | Aug. 3, 1959 |
| 597,098 | Canada | Apr. 26, 1960 |

OTHER REFERENCES

Brown et al.: "Journal of the American Chemical Society," vol. 80, pp. 1552, 1558 (1958).